Patented Mar. 9, 1937

2,073,136

UNITED STATES PATENT OFFICE 2,073,136

CERAMIC COMPOSITION AND METHOD OF PREPARING

Albert Lee Bennett, Glendale, Calif., assignor to Malinite Corporation, Los Angeles, Calif., a corporation of California No Drawing. Application April 14, 1934, Serial No. 720,657

12 Claims. (Cl. 106—10)

This invention relates to the preparation of ceramic bodies for use in jiggering or plastic pressing various types of ware and is particularly directed toward the preparation of those bodies which exhibit plastic flow and are coherent when caused to flow by the application of pressure thereto. The invention also relates to the preparation of bodies for jiggering and plastic pressing which are characterized by the presence of relatively minor proportions of clay and high proportions of a matrix material.

The invention also relates to the preparation of bodies of the character stated in a rapid and economical manner, whereby the customary aging is obviated. By the term "jigger" as used herein, reference is made to those processes of working plastic compositions into shaped articles in which a potter's wheel or similar device is employed. By the term "plastic pressing" as used herein, reference is made to those molding or forming operations in which a plastic body capable of exhibiting plastic flow upon the application of pressure is used. Such bodies are to be distinguished from bodies used in dry pressing as dry pressed bodies are not coherent when pressure is applied thereto and will not flow coherently but instead break up into particles or portions.

Generally, a jiggering body consists essentially of clay which is reduced to a state of fine division, then washed with a sufficient amount of water to produce a slip or fluid suspension, then filter-pressed or partially dewatered in any suitable manner, and the resulting billets stored for a protracted period of time so as to develop desired plastic properties. The billets of clay are stored or aged for a period of at least six months, some little understood but apparently necessary action taking place during this period of time.

The process of this invention, however, distinguishes from the hereinabove described prior process in that the body itself contains but relatively small percentages of clay (less than 30% to 35%) and it is not necessary to store or age the resulting plastic composition.

An object of the invention, therefore, is to disclose and provide a method of preparing bodies for jiggering and plastic pressing, in a rapid and economical manner.

Another object is to disclose and provide a composition capable of being prepared and used in the manufacture of plastic molded bodies, which composition is extremely tough, strong and resistant to shock.

A further object is to disclose and provide a composition capable of being used in jiggering and plastic-pressing, the jiggered or pressed bodies being adapted for use in a single firing process in which both the body and a surface glaze are matured at the same time during a single burning operation, such burning operation consuming but a very short period of time.

Other objects, uses and advantages of this invention will become apparent to those skilled in the art from the following more detailed description of a preferred composition and method of preparation and of certain modifications thereof.

Inasmuch as one of the objects of this invention is to disclose a body capable of being jiggered or plastic-pressed, then covered with a glaze-producing material, and then subjected to a single short high-speed burning operation in which both the body and the glaze are brought to maturity at substantially the same time, the customary clay bodies or mixes can not be employed. Instead, this invention pertains to the production of bodies from magnesia-containing materials, a matrix material, and relatively small quantities of clay. Less than 30%–35% of clay should be present in the composition. When larger quantities are used, the body becomes unmanageable during drying and firing and can not be brought to maturity nor will the glazes develop the requisite colors nor adhere without crazing or cracking. Any magnesia-containing, raw or partly prepared material can be used. Material such as pyrophyllite, tremolite, actinolite, sepiolite and talc may be used. Attention is called to the fact that pyrophyllite is included, although this material is a hydrous aluminum silicate. Pyrophyllite has all of the physical characteristics of the other materials mentioned composed essentially of magnesium silicate.

In ordinary jiggering bodies, clay is essential whereas in the composition of this invention, the clay present is utilized only as a plasticizer. Other plasticizing agents, such as sodium or aluminum alginate, colloidal clays such as bentonite, and vegetable gums, can be substituted for a part or even all of the small quantity of clay referred to in the specific examples of this invention.

The composition should also contain not less than about 8% or 10% by weight of a matrix material, although as low as 5% of the more reactive matrix materials is sufficient. By the term "matrix material" as used herein, reference is made to prefused amorphous, relatively low melting point substances or "frits" such as window glass cullet, bottle glass, soda lime glasses, or other previously fused and prepared frits, or highly alkaline natural materials such as sodalite, volcanic glasses, colemanite, and other natural materials, preferably containing a high proportion of alkalies.

An illustrative composition may comprise about 35% by weight of a previously calcined and then ground magnesia-containing material such as sepiolite, tremolite or talc, 25% by weight of a raw talc or tremolite, 15% by weight of ground matrix material such as a common glass, and 25% of a clean, tough, plastic, preferably non-carbonaceous clay.

The calcined and ground magnesia-containing material is ground to a fineness sufficient to permit the material to be worked to a smooth finish. It may be ground to pass a 60 mesh sieve or 100 mesh sieve but need not be ground finer. The matrix material and the raw magnesia-containing material may be ground so that substantially all passes a 100 mesh sieve and about 95% passes through a 150 or 200 mesh sieve.

In the preferred method of preparing a suitable body from the above ingredients, the materials are mixed in dry form and then a sufficient amount of water is added thereto so as to thoroughly wet particles of material and produce a plastic mass. All or a portion of the water thus added is acidified with any of the mineral acids or with any organic acid such as citric, acetic, oxalic, etc., provided the acid is of an activity greater than that of tannic acid. The amount of acid thus added should be sufficient to render the body slightly acidic. The amount of acid added is sufficient so that the moist plastic material is not acid to methyl-orange nor alkaline to phenolphthalein. This condition is equivalent to a pH of between about 5 and 8, when the approximate and normal indicator response characteristics only are considered. In making this determination, a pat of the plastic composition is smoothed out with a trowel or spatula and a few drops of the indicator solution placed on the surface so prepared. Although preferably the composition should not show a basic reaction with phenolphthalein, a composition may be used when shortly after preparation thereof it is slightly basic to phenolphthalein. In such event, however, the composition should be used immediately as it will not be stable for more than one or two days. From about 200 to 1500 cc. of 80% acetic acid may be thus added to 1 ton of body of the illustrative composition given hereinabove to obtain the desired condition.

The plastic acidified mass is vigorously pugged or mixed, passed into a deaerating chamber (or deaerated during pugging), and then extruded into billets. Bats may be cut from these billets for immediate use or the billets may be stored for later use. It is important that the billets be stored at a temperature lower than about 65° F. as the composition is not stable for any appreciable length of time at higher temperatures.

The composition prepared as above described will be found to be eminently suited for the production of ware by hand molding, jiggering or plastic pressing operations, even though only a minor proportion of the bodies consists of clay. The amount of acid which is added must be determined experimentally for almost every mixture, since every clay and natural mineral varies even from shipment to shipment. In order to assist the operator in determining the amount of acid, the following is suggested:

After substantial dewatering and while the mass is in a plastic, moldable condition, it should not flow under its own weight and when puddled, free water should not separate out. The mass should be plastic and stretch without cracking, as is the case when the mass is over-acidified or when the body is short working. The body should exhibit high coherence and although exhibiting plastic flow upon the application of pressure, it should maintain its shape when the pressure is removed. It should not be runny or liquid.

Bodies prepared as above described may be used in molding or forming various types of ware, such as dinnerware, by the same methods as those usually employed for semi-porcelain bodies. Where necessary, the molded shapes can be remolded or modified while plastic, with remarkable freedom from warping or straining. The body has an extremely low drying shrinkage and remarkably low losses occur during drying. It is much stronger in the dry state than the usual semi-porcelain bodies, the average strength being between 350 and 450 pounds per square inch in dried form. Because of this strength, it cuts harder and does not finish as fast as hotel china or semi-porcelain, although a power-driven finisher may be used safely.

Although the body may be used in the usual two fire processes, it is particularly well adapted for a rapid one fire operation.

The glaze may be applied to the molded body either by dipping, spraying or dusting without weakening the molded form. During firing, it is desirable that the body be brought up to the maturing temperature rapidly, the maximum temperature ranging from about 1650° F. to 2000° F. The entire firing treatment may be accomplished in from 4 to 20 hours time (including cooling), depending on the type of equipment used and the character of the product desired. During burning, very little shrinkage takes place.

The matrix material being prefused and amorphous, matures rapidly, retaining the magnesia-containing substances in suspension therein. Because of the relatively high proportion of matrix material in the body, the glaze is not in the nature of a sharply separated veneer but instead becomes an integral part of the finished object, the glaze blending or merging gradually through a transition zone which forms as the glaze and body mature together in the single firing operation.

After firing, the average transverse strength of the finished ware is generally not less than 5000 pounds per square inch and considerably higher strengths are obtained. An additional advantage is that the finished ware is relatively light in weight in comparison with the usual semi-porcelain ware. The glazes used may be either glossy, satin or matte in texture and in addition to the wide range of normal pottery dinnerware colors, unusual orange and red glazes, such as cadmium yellow, pure orange, scarlet and spectrum red (as clasified in Ridgeway's "Color Standards and Nomenclature") can be obtained.

Although a specific composition has been described for illustrative purposes, it is to be understood that numerous changes can be made. The raw and calcined or dehydrated magnesia-containing bodies may be used in varying proportion. When non-carbonaceous clays are used, the ingredients may be present in proportions varying within the following limits:

| | Percent |
|---|---|
| Calcined magnesia-containing material | 20–40 |
| Raw magnesia-containing material | 20–40 |
| Non-carbonaceous clay | 20–35 |
| Matrix material | 8–60 |

Either the raw or the calcined magnesia-containing material can be completely eliminated but better bodies are obtained if they are conjointly used. Carbonaceous clays are not recommended for good quality ware because of the gray color which is developed and also because of the instability of the processed mass. Because of the fast firing schedules preferably used, the carbonaceous matter tends to remain in the body of the ware and does not burn out completely, thereby imparting a black or gray color to the body. If it is desired to incorporate washed kaolin or English china clay, it should normally be used in amounts not exceeding 5% to 10% of the total mix.

The continuous method of preparing the bodies described hereinbefore is preferred but inasmuch as the addition of only sufficient acidified water to the dry mix to produce plasticity is a step requiring careful control, the following method may be used in the alternative, even though the alternative method involves the added step of dewatering or filtering. In this alternative method, the materials may be blunged or pugmilled in the presence of sufficient water to produce a thin, pumpable slurry. About 225 gallons per ton of ingredients are used. From 1000 to about 5000 cc. of 80% acetic acid, or its equivalent, are added per ton of dry ingredients. Preferably, the thin slurry is blunged for some time in the presence of the acid and then sent through a filter press or other suitable dewatering apparatus. The filtrate will contain about two-thirds of the acid added to the batch, the balance being retained in the body. The filter press cakes or dewatered body may then be formed into billets and stored in piles or on skids or on trays. This body may be used immediately or the billets may be stored for periods of two to four months at temperatures below 65° F. The bats can be made from these billets immediately prior to use.

In the event the bodies prepared as above described are stored at temperatures above 65° F. for any appreciable length of time, there is a tendency for the bodies to become thin and soupy so that shapes made therefrom will slump. Such degraded bodies, unsatisfactory for use in plastic pressing or hand molding operations, may be recovered and made suitable by introducing small quantities of acid thereinto, such introduction being preferably made by blunging, mixing or repugging the now relatively thin mass with a dilute acid solution. At no time should enough acid be added so as to completely deflocculate the clay present.

I claim:

1. A body adapted for use in plastic pressing and jiggering characterized by an ability to exhibit plastic flow by the application of pressure thereto and coherence when caused to flow by such application of pressure, said body containing between 5% and 35% of clay, between 25% and 80% by weight of a material from the group consisting of pyrophyllite, tremolite, actinolite, sepiolite and talc, and between 8% and 40% by weight of a matrix material high in alkalies from the group consisting of glass, sodalite, and colemanite, said body being acid to phenolphthalein and alkaline to methyl orange.

2. A body adapted for use in plastic pressing and jiggering characterized by an ability to exhibit plastic flow by the application of pressure thereto and coherence when caused to flow by such application of pressure, said body containing between 5% and 35% by weight of clay, between 25% and 80% by weight of a magnesia-containing mineral, and between 5% and 40% of a matrix material high in alkalies, the body being acid to phenolphthalein and alkaline to methyl orange, the clay being in a flocculated condition.

3. A method of preparing bodies for use in plastic pressing, said bodies exhibiting plastic flow and being coherent when caused to flow by the application of pressure thereto, which comprises: intimately mixing a body containing from about 8% to 40% of matrix material, between 5% and 35% of clay, and between 25% and 80% by weight of a previously calcined and then ground magnesia-containing mineral, with a dilute solution of an acid having an activity greater than tannic acid, the acid being added in quantities insufficient to render the body acid to methylorange and insufficient to deflocculate the clay but sufficient to produce an acid reaction with phenolphthalein.

4. A body adapted for use in plastic pressing and jiggering characterized by an ability to exhibit plastic flow by the application of pressure thereto and coherent when caused to flow by such application of pressure, said body containing between 5% and 35% of clay, and between 25% and 80% by weight of previously calcined and then ground mineral from the group consisting of pyrophyllite, tremolite, actinolite, sepiolite and talc, and between 8% and 40% by weight of a matrix material high in alkalies from the group consisting of glass, sodalite, and colemanite, said body being acid to phenolphthalein and alkaline to methylorange.

5. A method of preparing plastic compositions for plastic pressing and jiggering which comprises: forming a mixture of ceramic materials, said mixture consisting essentially of 5% to 35% of clay, 25% to 80% of a magnesia-containing mineral and 8% to 40% of a matrix material high in alkalies, said clay, mineral and matrix material being in finely divided form, and introducing into such mixture a dilute acid solution in quantity sufficient to incorporate in such mixture acid in amount sufficient to render the mixture acid to phenolphthalein but not sufficient to render said mixture acid to methylorange.

6. In a method of the character described in claim 5, the further step of deaerating the acidified mixture and storing the same at a temperature below about 65° F.

7. A method of the character described in claim 5 characterized in that an acid having an activity greater than tannic acid is introduced into said mixture.

8. A method of preparing plastic compositions for plastic pressing and jiggering which comprises: forming a mixture of ceramic materials consisting essentially of 5% to 35% of clay, 25% to 80% of magnesia-containing mineral and 8% to 40% of a matrix material high in alkalies, said clay, mineral and matrix material being in finely divided form, adding to said mixture water in quantity sufficient to render said mixture plastic, and then introducing into such mixture acetic acid in an amount within the range 200 cc. to 5000 cc. of 80% acetic acid per ton of said mixture, said acid being incorporated in quantity sufficient to render said mixture acid to phenolphthalein but insufficient to render said mixture acid to methylorange.

9. A method of preparing plastic compositions for plastic pressing and jiggering which comprises: dehydrating a magnesia-containing mineral, then grinding the same to a state of fine division, forming a mixture consisting essentially of 25% to 80% of said dehydrated and ground magnesia-containing mineral, 5% to 35% of clay and 8% to 40% of a matrix material high in alkalies, adding water to said mixture to form a plastic body, and introducing into such body an acid solution in quantity sufficient to incorporate in said body acid sufficient to render the body acid to phenolphthalein but not acid to methylorange.

10. A method of preparing plastic compositions for plastic pressing and jiggering which comprises: intimately mixing clay, magnesia-containing mineral and matrix material in finely divided form in the proportion of from about 5% to 35% by weight of clay, 25% to 80% by weight of magnesia-containing mineral and 8% to 40% by weight of a matrix material high in alkalies; mixing the said ingredients with sufficient water to form a pumpable slurry, adding from about 1000 cc. to 5000 cc. of 80% acetic acid per ton of dry solids to the mixture, and then dewatering the mixture to remove excess liquid to form a plastic body acid to phenolphthalein but not acid to methylorange.

11. A method of preparing plastic compositions for plastic pressing and jiggering which comprises: intimately mixing clay, magnesia-containing mineral and matrix material in finely divided form in the proportion of from about 5% to 35% by weight of clay, 25% to 80% by weight of magnesia-containing mineral and 8% to 40% by weight of a matrix material high in alkalies; mixing the said ingredients with sufficient water to form a pumpable slurry, then introducing dilute solution of an acid having an activity greater than tannic acid to said mixture, and then dewatering the mixture to remove excess liquid so as to form a plastic body acid to phenolphthalein.

12. A body adapted for use in plastic pressing and jiggering characterized by an ability to exhibit plastic flow by the application of pressure thereto and coherence when caused to flow by such application of pressure, said body consisting essentially of between about 5% and 35% by weight of clay, between about 25% and 80% by weight of a magnesia-containing mineral and between about 8% and 40% by weight of a matrix material high in alkalies, said body containing added acid, said added acid having an activity greater than tannic acid, in amount sufficient to render said body acid to phenolphthalein but not acid to methylorange.

ALBERT LEE BENNETT.